(12) United States Patent
Son et al.

(10) Patent No.: US 10,439,230 B2
(45) Date of Patent: Oct. 8, 2019

(54) METHOD FOR MANUFACTURING ELECTRODE FOR FUEL CELL AND ELECTRODE MANUFACTURED THEREBY

(71) Applicants: HYUNDAI MOTOR COMPANY, Seoul (KR); KIA MOTORS CORPORATION, Seoul (KR)

(72) Inventors: Dae-Yong Son, Seoul (KR); Yoon-Hwan Cho, Yongin-si (KR); Jin Seong Choi, Yongin-si (KR); Young-Taek Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 196 days.

(21) Appl. No.: 15/651,550

(22) Filed: Jul. 17, 2017

(65) Prior Publication Data

US 2018/0026274 A1   Jan. 25, 2018

(30) Foreign Application Priority Data

Jul. 21, 2016   (KR) ........................ 10-2016-0092799

(51) Int. Cl.
| | |
|---|---|
| *H01M 4/96* | (2006.01) |
| *B01J 35/10* | (2006.01) |
| *B01J 37/04* | (2006.01) |
| *B01J 37/08* | (2006.01) |
| *H01M 4/86* | (2006.01) |
| *H01M 4/88* | (2006.01) |
| *H01M 4/90* | (2006.01) |
| *H01M 8/1004* | (2016.01) |
| *H01M 4/92* | (2006.01) |

(52) U.S. Cl.
CPC .............. *H01M 4/96* (2013.01); *B01J 35/10* (2013.01); *B01J 37/04* (2013.01); *B01J 37/08* (2013.01);
(Continued)

(58) Field of Classification Search
CPC .... H01M 4/96; H01M 4/8663; H01M 4/8814; H01M 4/8828; H01M 4/8882;
(Continued)

(56) References Cited

U.S. PATENT DOCUMENTS

| | | | | |
|---|---|---|---|---|
| 6,641,862 B1 * | 11/2003 | Grot | ................... | H01M 4/8605 427/115 |
| 7,842,153 B2 * | 11/2010 | Chien | ................... | H01M 4/921 156/230 |

(Continued)

FOREIGN PATENT DOCUMENTS

| | | | |
|---|---|---|---|
| JP | 2004281305 A | * | 10/2004 |
| JP | 2012212661 A | * | 11/2012 |

(Continued)

OTHER PUBLICATIONS espacenet.com—EPO machine translation of the description of KR 2010-0068029. (Year: 2010).*

*Primary Examiner* — Gregg Cantelmo
(74) *Attorney, Agent, or Firm* — Morgan, Lewis & Bockius LLP

(57) ABSTRACT

A method for manufacturing an electrode for a fuel cell includes a mixing step of producing a first mixed solution by mixing a carbon support, a metal catalyst, a binder and a first dispersion solvent, a drying step of producing a first mixed solution dried body by drying the first mixed solution, a heat treatment step of heating the first mixed solution dried body, a second mixed solution production step of producing a second mixed solution by dissolving the heat-treated first mixed solution dried body in a second dispersion solvent, and a release paper coating step of producing an electrode by coating the second mixed solution onto a release paper, and then drying the second mixed solution.

10 Claims, 4 Drawing Sheets

(52) U.S. Cl.
CPC ....... *H01M 4/8663* (2013.01); *H01M 4/8814* (2013.01); *H01M 4/8828* (2013.01); *H01M 4/8882* (2013.01); *H01M 4/9041* (2013.01); *H01M 4/926* (2013.01); *H01M 8/1004* (2013.01); *Y02P 70/56* (2015.11)

(58) Field of Classification Search
CPC .. H01M 4/9041; H01M 4/926; H01M 8/1004; Y02P 70/56; B01L 35/10; B01L 37/07; B01L 37/08
See application file for complete search history.

(56) References Cited

U.S. PATENT DOCUMENTS

| | | | | |
|---|---|---|---|---|
| 8,518,607 | B2 * | 8/2013 | Kim | H01M 4/8605 429/535 |
| 8,835,344 | B2 * | 9/2014 | Lee | H01M 4/8663 502/101 |
| 2006/0046120 | A1 * | 3/2006 | Merzougui | H01M 4/8605 429/492 |
| 2010/0323273 | A1 * | 12/2010 | Liu | H01M 4/8668 429/487 |
| 2011/0143253 | A1 * | 6/2011 | Miyata | H01M 4/8807 429/480 |
| 2013/0157169 | A1 * | 6/2013 | Madden | H01M 4/8652 429/482 |

FOREIGN PATENT DOCUMENTS

| | | |
|---|---|---|
| JP | 5405275 B2 | 2/2014 |
| JP | 6028650 B2 | 11/2016 |
| KR | 10-2010-0068029 A | 6/2010 |
| KR | 10-1282678 B1 | 7/2013 |
| WO | WO-2015140712 A1 * | 9/2015 ............. B01J 37/16 |

* cited by examiner

Prior Art

METHOD FOR MANUFACTURING ELECTRODE FOR FUEL CELL AND ELECTRODE MANUFACTURED THEREBY

CROSS-REFERENCE TO RELATED APPLICATIONS

This application claims the benefit of priority under 35 U.S.C. § 119 to Korean Patent Application No. 10-2016-0092799, filed on Jul. 21, 2017 with the Korean Intellectual Property Office, the disclosure of which is incorporated herein by reference in its entirety.

TECHNICAL FIELD

The present disclosure relates to a method for manufacturing an electrode for a fuel cell and an electrode manufactured thereby, and more specifically, to a corresponding method and electrode having improved slurry dispersibility and stability by allowing a binder and a metal catalyst to flow together in the slurry.

BACKGROUND

In general, as illustrated in FIG. 1, a membrane electrode assembly (MEA) 1 of a fuel cell, which is used in a hydrogen fuel cell automobile, is composed of two electrodes (anode and cathode) 1 and 1' and an electrolyte membrane 2 interposed between the electrodes 1 and 1', and the membrane electrode assembly (MEA) is referred to as a membrane electrode assembly having a three-layer structure.

When a gas diffusion layer ('GDL') (not illustrated) is conjugated onto the electrodes 1 and 1' of the membrane electrode assembly as described above, a membrane electrode assembly having a five-layer structure is produced.

Here, the electrodes 1 and 1' are composed of a metal catalyst which generates electrons and a support which supports the metal catalyst and moves electrons. Carbon may be used as a material for the support.

In this case, in order to manufacture the electrodes 1 and 1', a slurry for a fuel cell is made by using carbon which is a support, a metal catalyst which generates electrons, and a binder (an ionomer) to mix the components with each other.

FIG. 2 illustrates a slurry for a fuel cell in the related art, and the slurry for a fuel cell in the related art is in a state where metal catalysts 3 supported on the carbon support are surrounded by a binder 4 by means of the mixing.

However, as illustrated in FIG. 2, a region V in which the binder 4 is not present around the metal catalyst 3 occurs, which causes an increase in resistance against the transfer of electrons of the metal catalyst 3, and as a result, there may be a problem in that the efficiency of the electrode is reduced.

As the binders 4 included in the slurry prepared as described above flow, a change in viscosity of the slurry occurs, and there is a concern in that the change in viscosity of the slurry may act as a factor which may degrade the dispersibility and stability of the slurry.

SUMMARY OF THE DISCLOSURE

The present disclosure has been made in an effort to provide a method for manufacturing an electrode for a fuel cell, which may improve the dispersibility and stability of a slurry for a fuel cell by removing a region in which a binder is not present around a metal catalyst of the slurry and reducing the fluidity of the binder, and a configuration of an electrode manufactured thereby.

An exemplary embodiment of the present disclosure discloses a method for manufacturing an electrode for a fuel cell, the method including: a mixing step of producing a first mixed solution by mixing a carbon support, a metal catalyst, a binder, and a first dispersion solvent; a drying step of producing a first mixed solution dried body by drying the first mixed solution; a heat treatment step of adding heat to the first mixed solution dried body; a second mixed solution production step of producing a second mixed solution by dissolving the heat-treated first mixed solution dried body in a second dispersion solvent; and a release paper coating step of producing an electrode by coating the second mixed solution onto a release paper, and then drying the second mixed solution.

The method for manufacturing an electrode for a fuel cell according to the present disclosure having the configuration as described above and an electrode manufactured thereby exhibit an effect of increasing the efficiency of the electrode by applying a process of mixing and drying a binder and a metal catalyst when a slurry for a fuel cell is prepared, to create a state where the binder is fixed around the metal catalyst and decrease the resistance against the electron transfer of the metal catalyst.

The present disclosure describes an effect of improving the dispersibility and stability of the slurry by allowing the binder and the metal catalyst to flow together in the slurry.

DETAILED DESCRIPTION

Figure 1:
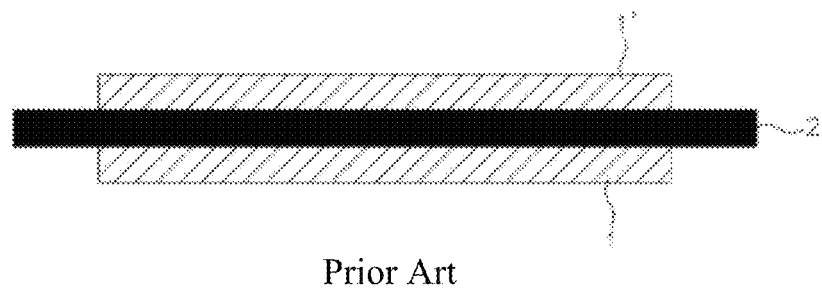
FIG. 1 is a configuration view of a general membrane electrode assembly for a fuel cell according to the related art.

Hereinafter, a method for manufacturing an electrode for a fuel cell according to the present disclosure and a configuration of an electrode manufactured thereby will be described in detail with reference to the accompanying drawings.

However, the disclosed drawings are provided merely as examples for enabling the spirit of the present disclosure to be sufficiently transferred to, and/or practiced by, a person skilled in the art. Accordingly, the present disclosure is not limited to the drawings suggested below, and may also be embodied as other exemplary embodiments.

Unless otherwise defined, the terms used in the specification of the present disclosure have meanings typically understood by a person with ordinary skill in the art to which the present disclosure pertains, and the detailed description on the publicly known functions and configurations, which may unnecessarily obscure the concepts of the present disclosure, will be omitted from the following description and accompanying drawings.

The present disclosure discloses a method for manufacturing an electrode for a fuel cell, the method including, in some embodiments: a mixing step of producing a first mixed solution by mixing a carbon support, a metal catalyst, a binder and a first dispersion solvent; a drying step of producing a first mixed solution dried body by drying the first mixed solution; a heat treatment step of adding heat to the first mixed solution dried body; a second mixed solution production step of producing a second mixed solution by dissolving the heat-treated first mixed solution dried body in a second dispersion solvent; and a release paper coating step of producing an electrode by coating the second mixed solution onto a release paper, and then drying the second mixed solution, and an electrode manufactured thereby.

A method for manufacturing an electrode for a fuel cell according to the present disclosure and an electrode manufactured thereby decreases the resistance against the electron transfer of a metal catalyst by applying a process of mixing and drying a binder and the metal catalyst when a slurry for a fuel cell is prepared, and creates a state where the binder is fixed around the metal catalyst.

The dispersibility and stability of the slurry may be improved by allowing the binder and the metal catalyst to flow together in the slurry.

First, in order to manufacture an electrode for a fuel cell according to the present disclosure, the following steps will be subsequently carried out in some exemplary embodiments.

1) Mixing Step

The mixing step is a step of producing a first mixed solution by mixing a carbon support which is a support, a metal catalyst which is supported on the carbon support, a binder, and a first dispersion solvent with each other. The carbon support is any one material selected from a group consisting of carbon black, carbon nano tube (CNT), carbon nano fiber (CNF), carbon powder, carbon black, acetylene black, ketjen black, activated carbon, carbon nano wire, carbon nano horn, carbon aerogel, carbon xerogel, and carbon nano ring, and/or a material composed of a mixture of at least two materials selected from the group.

The metal catalyst is a catalyst composed of any one or more metals selected from a group consisting of platinum, iridium, palladium, and ruthenium, or a catalyst composed of oxide of any one metal selected from the group, or a catalyst composed of an alloy of at least two metals selected from the group.

The first dispersion solvent may be composed of any one of distilled water, ethanol, isopropyl alcohol (IPA), propanol, ethoxy ethanol, butanol, ethylene glycol, and amyl alcohol, and/or a combination of two or more dispersion solvents of the components.

2) Drying Step

A first mixed solution dried body in a powder phase is produced by spray drying the first mixed solution, which is produced in the mixing step, at a rate of 5 to 30 mL/min under a nitrogen atmosphere using a spray dryer. The produced first mixed solution dried body is in a state where a binder is fixed well to a metal catalyst.

As another method, or embodiment, for the drying step, the first mixed solution may be dried in an oven.

3) Heat Treatment Step

The bonding strength of the binder is reinforced by adding heat to the first mixed solution dried body.

4) Second Mixed Solution Production Step

A second mixed solution is produced by dissolving the heat-treated first mixed solution dried body in a second dispersion solvent.

The second dispersion solvent may be composed of any one of ethanol, IPA, propanol, ethoxy ethanol, butanol, ethylene glycol, distilled water, and amyl alcohol, and/or a combination of two or more dispersion solvents of the components.

5) Release Paper Coating Step

An electrode for a fuel cell according to exemplary embodiments of the present disclosure is produced by coating the second mixed solution onto a release paper using an apparatus such as a bar coater and a slot die coater, and then finally drying the second mixed solution.

As a material for the release paper, it is possible to use polyethylene naphthalate (PEN), polyethylene terephthalate (PET), polytetrafluoroethylene (PTFE), polyimide (PI), and/or a film in which two or more of the polymers are stacked.

Figure 2:
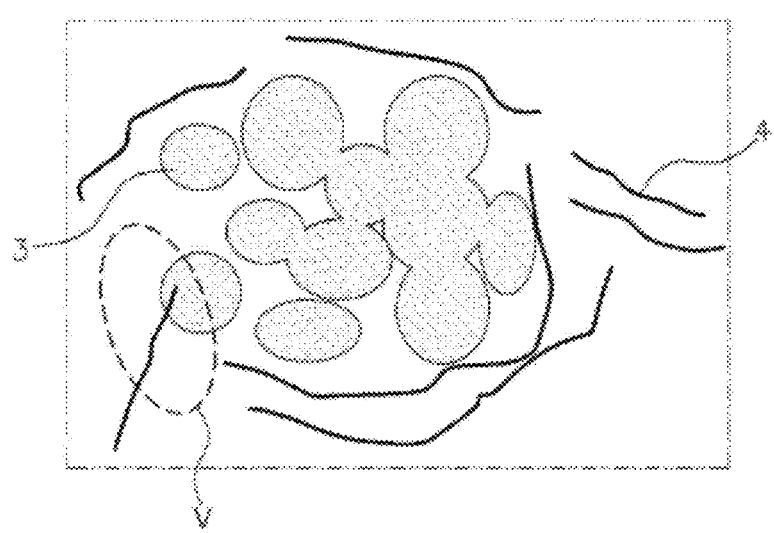
FIG. 2 is a view illustrating a slurry for a fuel cell according to the related art.
Figure 3:
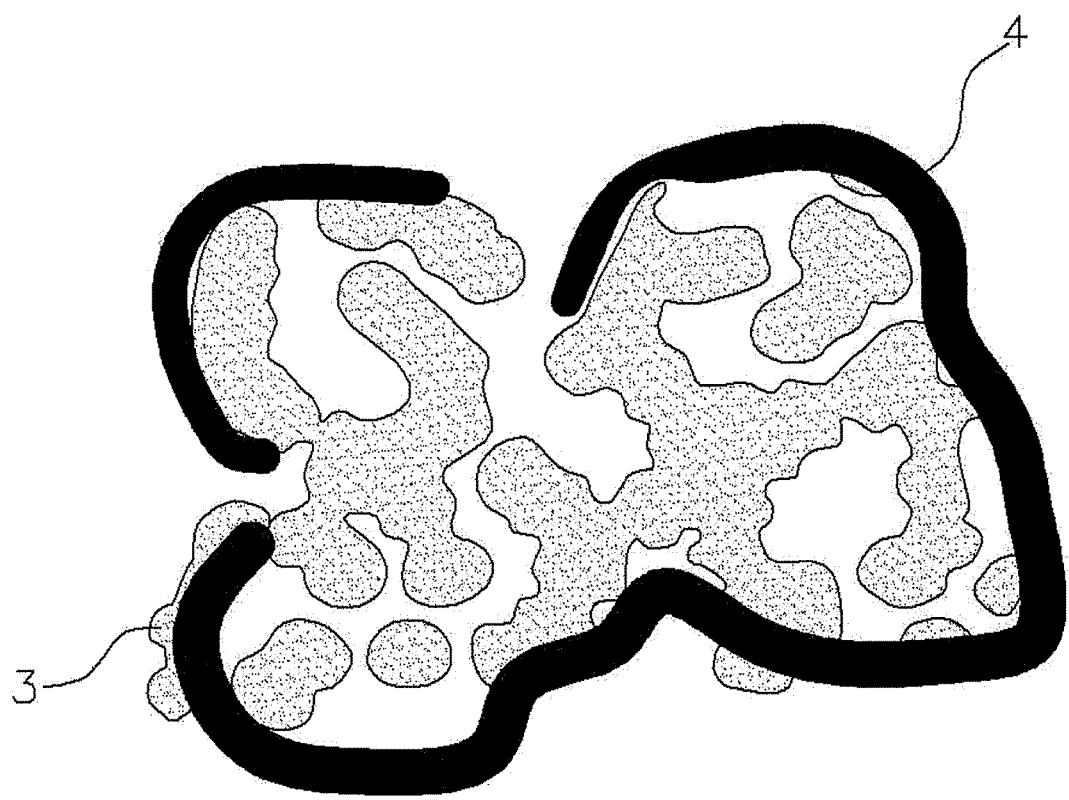
FIG. 3 is a view illustrating a slurry for a fuel cell according to exemplary embodiments of the present disclosure.

Accordingly, in the electrode for a fuel cell according to exemplary embodiments of the present disclosure, which is manufactured by the steps as described above, the first mixed solution, which is a slurry for a fuel cell prepared in the mixing step, is spray dried by using a spray dryer, and then heat-treated in the drying step and the heat treatment step, and as a result, a binder 4 is fixed around a metal catalyst 3 as illustrated in the slurry for a fuel cell according to the present disclosure in FIG. 3, such that a region V in which the binder in the related art as illustrated in FIG. 2 is not present is removed, and the resistance against the transfer of electrons of the metal catalyst 3 is decreased. As a result, the efficiency of the electrode is increased.

The dispersibility and stability of the slurry may be improved by allowing the binder and the catalyst to flow together in the solvent.

A partial aliquot in the total amount of the binder used during the production of the first mixed solution may be introduced during the production of the first mixed solution by adjusting the amount of the binder to be mixed, and the other aliquot may be introduced in the second mixed solution production step.

When the aliquot of the binder to be introduced is introduced in divided amounts during the production of the first mixed solution and during the production of the second mixed solution, the total amount of the binder to be introduced is ultimately the same as the amount of the case where the aliquot is not divided (the case where the binder is introduced only during the production of the first mixed solution), but it is possible to obtain an advantage which may further improve the interface bonding strength between the membrane and the electrode in the MEA while maintaining the efficiency of the electrode.

In the method for manufacturing an electrode for a fuel cell according to exemplary embodiments of the present disclosure, in the mixing step of producing the first mixed solution, or the step of producing the second mixed solution, a radical scavenger may be added.

In this case, the radical scavenger may be a nano particle having a diameter of 1 nm to 20 nm on average and is composed of any one oxide selected from a group consisting of cerium oxide, zirconium oxide, manganese oxide, aluminum oxide, and vanadium oxide, and/or a mixture of at least two oxides selected from the group.

Meanwhile, like the binder, a partial aliquot in the total amount of the radical scavenger may be introduced during the production of the first mixed solution by adjusting the amount of the radical scavenger to be mixed, and the other aliquot may be introduced in the second mixed solution production step.

Figure 4:
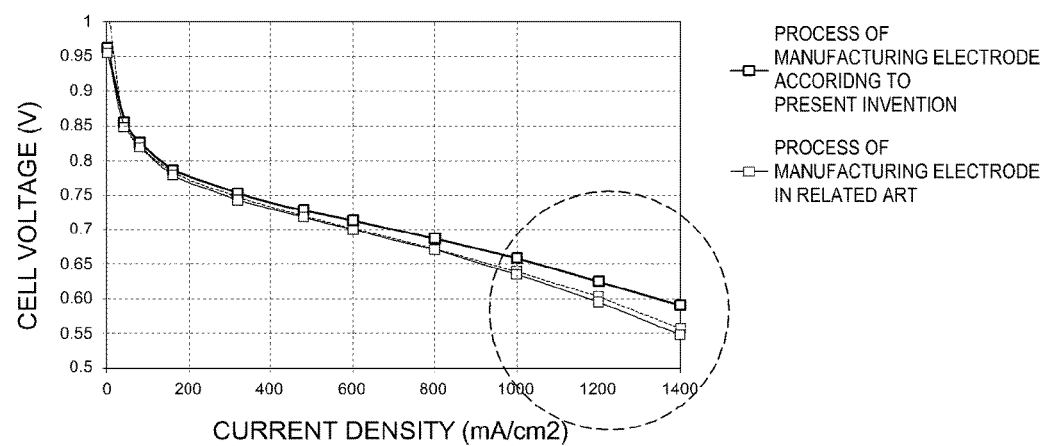
FIGS. 4 and 5 are graphs illustrating a performance of an electrode for a fuel cell according to exemplary embodiments of the present disclosure.
Figure 5:
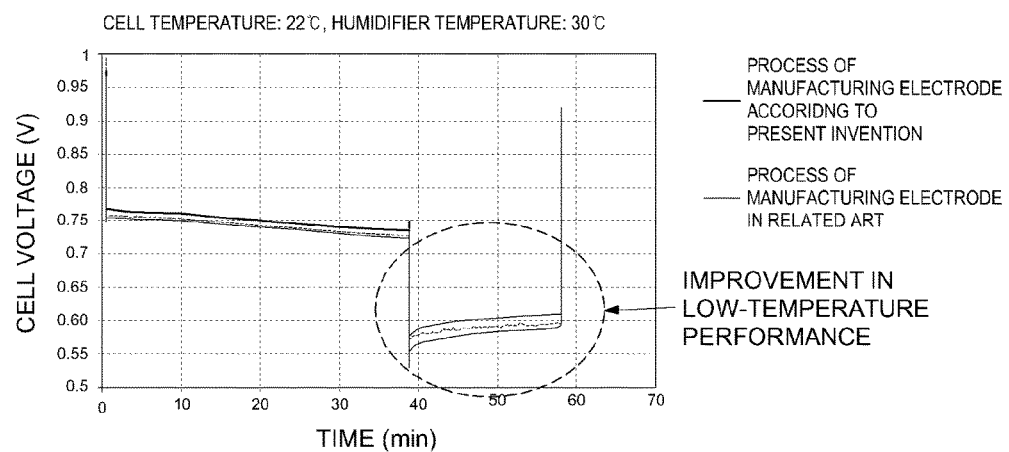

FIGS. 4 and 5 are graphs illustrating a performance of the electrode for a fuel cell according to exemplary embodiments of the present disclosure. As illustrated in FIG. 4, the electrode for a fuel cell according to exemplary embodiments of the present disclosure has a cell voltage of 0.59 V to 0.66 V, which is at a level more than 0.55 V to 0.64 V in a cell voltage of an electrode for a fuel cell in the related art, at a high current density section of 1,000 mA/cm$^2$ to 1,400 mA/cm$^2$ in current density, which shows that the electron transfer of the electrode is improved.

As illustrated in FIG. 5, under a low temperature state of a cell temperature of 22° C. and a humidifier temperature of 30° C., the electrode for a fuel cell according to exemplary embodiments of the present disclosure has a cell voltage of 0.58 V to 0.62 V, which is at a level more than 0.55 V to 0.58 V in a cell voltage of an electrode for a fuel cell in the related art, at a time section of 40 minutes to 60 minutes, which shows that the electron transfer of the electrode is improved even under a low temperature state.

Moreover, another exemplary embodiment of the present disclosure discloses a method for manufacturing an electrode for a fuel cell, the method including: a mixing step of producing a first mixed solution by mixing a metal catalyst, a binder and a first dispersion solvent; a drying step of producing a first mixed solution dried body by drying the first mixed solution; a heat treatment step of heating the first mixed solution dried body; a second mixed solution production step of producing a second mixed solution by dissolving the heat-treated first mixed solution dried body in a second dispersion solvent; and a release paper coating step of producing an electrode by coating the second mixed solution onto a release paper, and then drying the second mixed solution.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, and it should be interpreted that all technical ideas which are equivalent to the present disclosure are included in the spirit and scope of the present disclosure.

What is claimed is:

1. A method for manufacturing an electrode for a fuel cell, the method comprising:
a mixing step of producing a first mixed solution by mixing a carbon support, a metal catalyst, a binder and a first dispersion solvent;
a drying step of producing a first mixed solution dried body by drying the first mixed solution;
a second mixed solution production step of producing a second mixed solution by dissolving the first mixed solution dried body in a second dispersion solvent; and
a release paper coating step of producing an electrode by coating the second mixed solution onto a release paper, and then drying the second mixed solution,
wherein a radical scavenger is introduced in the mixing step of producing the first mixed solution and the step of producing the second mixed solution, a partial aliquot in the total amount of the radical scavenger is introduced during the production of the first mixed solution, and another aliquot of the radical scavenger is introduced in the second mixed solution production step.

2. The method of claim 1, wherein the first dispersion solvent in the mixing step includes one or more of distilled water, ethanol, isopropyl alcohol (IPA), propanol, ethoxy ethanol, butanol, ethylene glycol and amyl alcohol.

3. The method of claim 1, wherein in the drying step, the first mixed solution is spray dried with a spray dryer.

4. The method of claim 1, wherein in the drying step, the first mixed solution is dried with an oven.

5. The method of claim 1, wherein the second dispersion solvent in the second mixed solution production step includes one or more of ethanol, IPA, propanol, ethoxy ethanol, butanol, ethylene glycol, distilled water and amyl alcohol.

6. The method of claim 1, wherein a partial aliquot in a total amount of the binder used during the production of the first mixed solution is introduced during the production of the first mixed solution, and another aliquot of the binder is introduced in the second mixed solution production step.

7. The method of claim 1, wherein the radical scavenger is a nano particle having a diameter of 1 nm to 20 nm on average and includes any one or more oxides selected from the group consisting of cerium oxide, zirconium oxide, manganese oxide, aluminum oxide and vanadium oxide.

8. The method of claim 1, wherein the carbon support is any one or more materials selected from the group consisting of carbon black, carbon nano tube (CNT), carbon nano fiber (CNF), carbon powder, carbon black, acetylene black, ketjen black, activated carbon, carbon nano wire, carbon nano horn, carbon aerogel, carbon xerogel and carbon nano ring.

9. The method of claim 1, wherein the metal catalyst is a catalyst including any one or more metals selected from the group consisting of platinum, iridium, palladium and ruthenium, or
a catalyst including an oxide of any one or more metals selected from the group consisting of platinum, iridium, palladium and ruthenium, or
a catalyst including an alloy of at least two metals selected from the group consisting of platinum, iridium, palladium and ruthenium.

10. A method for manufacturing an electrode for a fuel cell, the method comprising:
a mixing step of producing a first mixed solution by mixing a metal catalyst, a binder and a first dispersion solvent;
a drying step of producing a first mixed solution dried body by drying the first mixed solution;
a second mixed solution production step of producing a second mixed solution by dissolving the first mixed solution dried body in a second dispersion solvent; and
a release paper coating step of producing an electrode by coating the second mixed solution onto a release paper, and then drying the second mixed solution,
wherein a radical scavenger is introduced in the mixing step of producing the first mixed solution and the step of producing the second mixed solution, a partial aliquot in the total amount of the radical scavenger is introduced during the production of the first mixed solution, and another aliquot is introduced in the second mixed solution production step.

\* \* \* \* \*